Patented Apr. 21, 1925.

1,535,003

UNITED STATES PATENT OFFICE.

EDWIN C. WHITE, OF BALTIMORE, MARYLAND.

MERCURY DERIVATIVE OF DIBROM-FLUORESCEIN.

No Drawing. Application filed July 26, 1921, Serial No. 487,686. Renewed January 5, 1925.

*To all whom it may concern:*

Be it known that I, EDWIN C. WHITE, a citizen of the United States, residing at Baltimore, in the State of Maryland, have invented certain new and useful Improvements in Mercury Derivatives of Dibrom-Fluorescein, of which the following is a specification.

This invention relates to a novel therapeutic agent, comprising essentially the mono-mercury derivative of di-brom-fluorescein, or an alkali-metal salt of such derivative, and to the process of preparing the same.

For a full understanding of the invention I will describe in detail a preferred mode of practicing the same, it being understood however that the invention is not restricted to the precise conditions specified by way of example.

49 grams of di-brom-fluorescein are dissolved in a solution of 8 grams of sodium hydroxid in 50 c. c. of water, and diluted to 200 c. c. To this solution 12.5 c. c. of glacial acetic acid are added with stirring. With sufficiently vigorous stirring a homogeneous pastry precipitate results.

A filtered solution of about 22.5 grams of mercuric oxid in 25 c. c. of glacial acetic acid and 50 c. c. of water, diluted after solution to 100 c. c., is then added to the suspended precipitate, and the whole diluted to about 500 c. c. The mixture is boiled until a small portion of filtered solution gives no test for mercury when treated with ammonium sulfid, the approximate time required for this operation being about 4.5-6 hours. As the boiling continues the precipitate becomes darker in color and more granular. It is washed, preferably by centrifuging, to remove acetic acid and sodium acetate, and dried at about 110° C. By close adherence to these conditions an almost quantitative yield may be secured.

The quantity of mercuric oxid specified above is in slight excess of the mono-molecular equivalent (21.7 grams): this excess takes care of the loss as mercurous acetate, which is always formed in small proportion when commercial yellow oxid of mercury is dissolved in acetic acid.

The product may be regarded as consisting essentially of di-brom-hydroxymercury-fluorescein, resulting from the substantially complete hydrolysis of an acetoxy-mercury compound which is probably formed as an intermediate. It is a red powder, which when ground exhibits marked dielectric properties, adhering to glass or paper even when perfectly dry. It is insoluble in the usual solvents but dissolves in two equivalents of sodium hydroxid yielding a deep cherry-red solution. Although the solution is stable it is regarded as a desirable precaution to keep it in dark colored bottles to decrease the tendency to decomposition on long standing.

The new preparation is employed either in the form of the free acid or its soluble (usually sodium) salts. The latter are readily prepared, for example by dissolving the red powder in an amount of sodium hydroxid solution sufficient to form the disodium salt, and evaporating the solution to dryness at as low a temperature as practicable, preferably under reduced pressure. The preparations are useful locally in the treatment of genito-urinary infections and other local infections.

I claim:—

1. The herein described novel product having therapeutic properties comprising the chlorine-free mono-mercury derivative of di-brom-fluorescein.

2. The herein described novel products having therapeutic properties comprising the chlorine-free alkali metal salts of the mono-mercury derivative of di-brom-fluorescein.

3. Process of preparing a mercury derivative of di-brom-fluorescein comprising reacting with mercuric acetate on an aqueous suspension of di-brom-fluorescein.

In testimony whereof, I affix my signature.

EDWIN C. WHITE.